United States Patent
Koutsomanis et al.

(10) Patent No.: US 12,032,883 B1
(45) Date of Patent: Jul. 9, 2024

(54) OPTIMIZATION OF CONFIGURABLE DISTRIBUTED COMPUTING SYSTEMS

(71) Applicant: PARALLELS INTERNATIONAL GMBH, Schaffhausen (CH)

(72) Inventors: Vasileios Koutsomanis, Moscow (RU); Igor Marnat, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 18/333,654

(22) Filed: Jun. 13, 2023

Related U.S. Application Data (63) Continuation of application No. 17/739,864, filed on May 9, 2022, now Pat. No. 11,709,978, which is a continuation of application No. 16/837,305, filed on Apr. 1, 2020, now Pat. No. 11,328,104.

(51) Int. Cl.
| | |
|---|---|
| *G06F 17/00* | (2019.01) |
| *G06F 9/451* | (2018.01) |
| *G06F 9/50* | (2006.01) |
| *G06F 30/20* | (2020.01) |

(52) U.S. Cl.
CPC .............. *G06F 30/20* (2020.01); *G06F 9/452* (2018.02); *G06F 9/5027* (2013.01); *G06F 9/5077* (2013.01)

(58) Field of Classification Search
CPC .................................................. G06F 17/5022
See application file for complete search history.

(56) References Cited

U.S. PATENT DOCUMENTS

| | | | |
|---|---|---|---|
| 8,719,914 B2 | 5/2014 | Edwards et al. | |
| 8,869,157 B2 * | 10/2014 | Raney | G06F 9/5044 718/102 |
| 8,954,309 B2 | 2/2015 | B'Far et al. | |
| 10,210,008 B2 | 2/2019 | Shimonishi et al. | |
| 10,826,787 B2 | 11/2020 | Soundararajan et al. | |
| 10,855,535 B1 | 12/2020 | Natanzon | |
| 11,270,220 B1 * | 3/2022 | Richardson | G06F 9/5044 |

* cited by examiner

*Primary Examiner* — Andy Ho
(74) *Attorney, Agent, or Firm* — Rosenberg, Klein & Lee (57) ABSTRACT

The subject matter of this specification can be implemented in, among other things, a method that includes accessing a plurality of target tasks for a computing system, the computing system comprising a plurality of resources, wherein the plurality of resources comprises a first server and a second server, accessing a plurality of configurations of the computing system, wherein each of the plurality of configurations identifies one or more resources of the plurality of resources to perform the respective target task of the plurality of target tasks, and performing, for each of the plurality of configurations, a simulation to determine a plurality of performance metrics, wherein each of the plurality of performance metrics predicts performance of at least one of the plurality of resources executing the plurality of target tasks on the computing system.

7 Claims, 5 Drawing Sheets

TABLE OF RESULTS — 300

| VIRTUAL FARM | LATENCY | THROUGHPUT | AVAILABILITY | BANDWIDTH | RESPONSE TIME | AVG. CPU LOAD | PEAK RESPONSE TIME |
|---|---|---|---|---|---|---|---|
| CONFIGURATION TYPE 1 | 150 ms | 1045 bps | 96% | 1 Mbps | 155 ms | 83% | 260 ms |
| CONFIGURATION TYPE 2 | 200 ms | 3312 bps | 91% | 3 Mbps | 220 ms | 78% | 235 ms |
| CONFIGURATION TYPE 3 | 120 ms | 3981 bps | 95% | 5.2 Mbps | 150 ms | 75% | 170 ms |
| CONFIGURATION TYPE 4 | 180 ms | 4306 bps | 98% | 4.1 Mbps | 220 ms | 70% | 225 ms |
| CONFIGURATION TYPE 5 | 213 ms | 573 bps | 92% | 0.5 Mbps | 235 ms | 81% | 240 ms |
| CONFIGURATION TYPE 6 | 86 ms | 3996 bps | 95% | 3.8 Mbps | 97 ms | 72% | 110 ms |
| CONFIGURATION TYPE 7 | 191 ms | 3317 bps | 98% | 3.2 Mbps | 200 ms | 67% | 218 ms |
| CONFIGURATION TYPE 8 | 112 ms | 3054 bps | 91% | 2.9 Mbps | 130 ms | 80% | 141 ms |

OPTIMIZATION OF CONFIGURABLE DISTRIBUTED COMPUTING SYSTEMS

CROSS-REFERENCE TO RELATED APPLICATIONS

This application claims the benefit of priority as a continuation of U.S. patent application Ser. No. 17/739,864 filed May 9, 2022; which itself claims the benefit of priority from U.S. patent application Ser. No. 16/837,305 filed Apr. 1, 2020 which has issued as U.S. Pat. No. 11,328,104; the entire contents of which were incorporated herein by reference.

TECHNICAL FIELD

This instant specification generally relates to running applications on a distributed computing system (DCS) having a flexible configurability. More specifically, the instant specification relates to simulating performance of a distributed computing system capable of having multiple configurations and to enabling selection of the most efficient configuration for a set of computational tasks to be executed on the DCS.

BACKGROUND

In modern computing environments, it is often advantageous to provide a system having multiple components (servers, storage devices, peripheral devices, etc.) to multiple users rather than to provide individual computing machines to each user. Such pooling of available resources allows maximizing resource utilization. For example, where resources of an individual machine would idle during periods of inactivity (or low activity) of the machine's user, in a DCS, the pooled resources of multiple machines can support computational demands of other, currently more active, users of the DCS. Different activities or applications executed by a user may be supported by different processing devices or servers of the DCS. Furthermore, even a single application may sometimes be executed on multiple servers, with a first software component of the application performing some tasks on a first server and a second software component performing additional tasks on a second server. If one resource (e.g., a server or a software) of the DCS fails, the execution of the corresponding task can be moved to and continued by other resources. To a user, execution of computations tasks on a DCS may appear indistinguishable from performing the same tasks on a personal computer.

DETAILED DESCRIPTION

In a modern computing environment used by a company, a government office, or any other organization that has multiple users, it may be more advantageous to pool various computational resources into a distributed computing system (DCS) to carry a multitude of concurrent tasks (e.g., performed by various users) in a coordinated (among various DSC resources) fashion rather than to provide personal computers with separate processors and storages to each individual user. Such a DCS can still be configured in one of many possible ways (or configurations). For example, the DCS may be configured so that heavy computational tasks may be performed on a first server, which may have the most processing power (e.g., the number of central processing units (CPUs) and the highest CPU speed). Graphics-heavy applications may be performed on a second server, which may have access to the largest cache of a video memory (e.g., VRAM). Database-searching may be performed on a third server, which may have the fastest access rate to a hard disk drive (HDD) where the main storage of organization's data is located. In selecting a different configuration of the DCS, it may be taken into account that access to the first server may be subject to device or network latency and that, as a result, only computational tasks of sufficiently high complexity may be directed to the first server. The computational tasks of a low or medium complexity, on the other hand, may be directed to a server that has the faster data exchange rate with the device (e.g., a thin client device) from which a specific user is accessing the DCS.

Available software for DCS, such as Parallels® Remote Access Server (RAS), may provide many options how to setup the organization's DCS. For example, to some users, the DCS may provide Remote Desktop Service (RDS) based on the Remote Desktop Session Host (RDSH) technology. To other users, however, the DCS may provide a virtual machine that uses the Virtual Desktop Infrastructure (VDI), or some other similar technology. In some instances, after a user has logged in into the DCS, the user may be presented with a list of applications, where different application are executed on various servers of the DCS and where other applications may be executed on cloud computing services (with some applications, possibly, executed both on cloud servers and local servers).

In a conventional decision-making approach to configuring a DCS, multiple people may need to be involved, each having an expertise in a different area. For example, a system administrator with a deep understanding of resources of the DCS may interact with a business unit representative having a knowledge of business objectives of the organization and, additionally, with a human resources specialist having an understanding of what types of tasks various users of the DCS may be performing in their day-to-day activities. If the DCS involves resources that are provided via outside networks (e.g., cloud computing and/or cloud storage resources), a cloud computing specialist may need to participate in configuring the DCS. Setting up the DCS may also involve a software licensing consultant who may weigh the costs of acquiring a number of licenses of a specific software against anticipated demand for the software among the users of the DCS. In some instances, a data security expert may need to be involved.

It may be difficult and/or expensive to assemble such a team of experts, some of whom may need to be brought from outside the organization. A lack of time, relevant cross-expertise, or a miscommunication, etc., may result in choosing a configuration that is unworkable, sub-optimal, or error-prone.

Aspects and implementations of the present disclosure address these and other shortcoming of the existing technology by describing simulations to determine multiple performance metrics of the DCS in different potential configurations. For example, one configuration may include joining all resources of the DCS into a single server farm. Another configuration may include forming multiple (two, three, or more) farms from the resources of the DCS. Different farms may be provided to separate groups of users (e.g., different departments, laboratories, etc.) with some users having access only to the resources of their assigned farm and some users having less restricted (or unrestricted) access to other farms as well. Within each farm, in some configurations, all users may be configured to receive RDS or all users may be configured to receive virtual machines. In some configurations, a certain percent of users may receive RDS and the rest of the users may receive virtual machines. In some configuration, some of the users may receive Remote PC Desktops, Mixed Desktops, and so on. In some configurations, each (or some) of the farms may have auto scaling, so that when the number of users increases (or decreases) during peak hours, the farm may instantiate (or terminate) a respective number of remote desktops or virtual machines available for users to meet the needs of the increased (or decreased) number of users. In some configurations, each farm may have a single secure client gateway through which the farm users may connect to the farm. In some configurations, each farm may have more than one secure client gateway.

Performance metrics may include measurements (taken while a set of target tasks is being executed on the DCS, as explained below) of a number of requests that each server of the DCS receives per unit of time (herein, per second, for the sake of concreteness), an average number of requests that all servers of the DCS (or all servers of a given farm) receive per second, an average response time and/or peak response time of each server, an average number of requests each server successfully completes per second, an average number of errors that each server returns per second, an average thread count for each server, the average hardware utilization levels (including CPU, memory, HDD utilizations, video memory utilization, and so on), the bandwidth and throughput of various network connections of the DCS, an average latency for each server, an average length of a queue for various printers (or other peripheral devices), and the like. In some implementations, performance metrics may include response rates, latencies, bandwidths, throughputs for connections between the resources of the DCS and outside resources, such as cloud computing servers and cloud storages that may be used to perform some tasks outsourced by the DCS.

Figure 1:
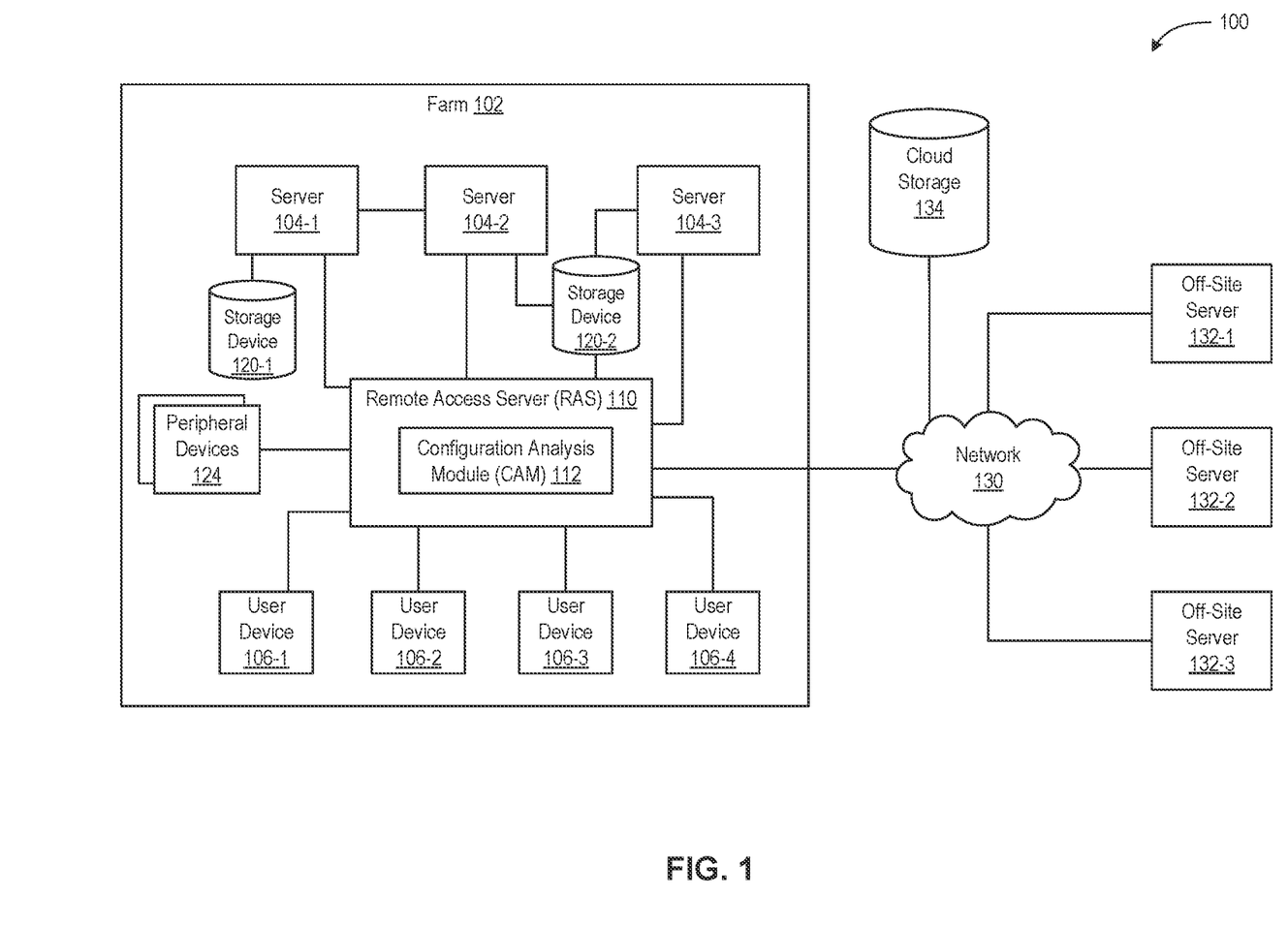
FIG. 1 illustrates schematically a high-level block diagram of a distributed computing system having multiple resources and capable of executing computational tasks in a variety of configurations, whose efficiency that can be simulated in accordance with implementations of the present disclosure.

FIG. 1 illustrates schematically a high-level block diagram of a DCS 100 having multiple resources and capable of executing computational tasks in a variety of configurations, whose efficiency that can be simulated in accordance with implementations of the present disclosure. Computing devices, systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity and conciseness. Various other computer systems, software or hardware components, and/or methods of their interconnection-which are not shown in FIG. 1 may be compatible with the methods and systems described herein. The systems and methods described herein may be implemented in hardware (e.g., general purpose and/or specialized processing devices, and/ or other devices and associated circuitry), software (e.g., instructions executable by a processing device), firmware, or a combination thereof. Various aspects of the disclosure are described in details below by way of examples, rather than by way of limitation.

As schematically illustrated by FIG. 1, the DCS 100 may include one or more farms 102 (only one farm is shown, for conciseness), which may include one or more servers 104 (e.g., servers 104-1, 104-2, and 104-3, although any number of servers may be used. The servers may be communicatively coupled with a remote access server (RAS) 110. The RAS 110 may be a separate server or may be implemented on one of the servers 104. The RAS 110 may further be communicatively coupled to a number of user devices 106, and may be providing computing resources to users of the user devices 106. The servers 104, the RAS 110, the user devices 106 (as well as other devices of the farm 102) may be communicating with an Ethernet network, over a wireless local area network (WLAN), over Internet, or a telecommunications network. A communication between the user devices 106 and the RAS 110 may occur through one or more secure gateway (e.g., gateway servers) that may be implemented as part of the RAS 110 or as separate servers (not shown explicitly on FIG. 1). The computing resources delivered to the users of the user devices 106 may include (but not be limited to) a virtual execution environment such as an RDS, a VDI, a containerization engine, or a virtual execution environment provided by an HTML5-enabled browser. The RAS 110 (alone or in conjunction with the gateway servers) may provide client authentication, load balancing, and/or other features related to brokering connections between users and the computing resources of the DCS 100.

The user devices 106 may be "lean" (or "thin") machines, which perform little computing, or storage of data, with only keyboard, mouse, and graphical interface data being exchanged between the lean client and the RAS 110, with the bulk of computing, data processing, and data storage taking place on the servers 104 and/or RAS 110. The applications executed on the servers 104 and/or RAS 110 may be delivered to the user devices 106 (and, hence, to the users) via, for example, a remote display protocol or other virtualization techniques. In one illustrative example, the RAS 110 may be Parallels® RAS.

The RAS 110 may use an optional client authenticating service (not shown) which facilitates establishing the identity of a user of the user devices 106. In particular, the client authenticating service may determine the level of access the particular user/user device combination may have to the RAS 110. By way of example, a user with the highest access level connecting from a work (e.g., desktop) computer may be allowed the maximum access to the resources of the DCS 100 whereas the same user accessing the RAS 110 from a mobile device may be allowed a more limited access to the resources of the DCS 100.

The resources of the DCS 100 may include one or more storage devices 120, such as persistent memory devices, HDDs, magnetic disk storage media, optical storage media, flash memory devices, and the like. Some of the storage devices may be accessible only by one server, e.g., the storage device 120-1 may be accessible only by the server 104-1. Some of the storage devices may be accessible by multiple servers, e.g., the storage device 120-2 may be accessible by the RAS 110 and by the servers 104-2 and 104-3. The resources of the DCS 100 may further include various peripheral devices 124. The peripheral devices 124 may be printers, scanners, or any other devices in communication with the RAS 110 (as shown) or other components of the DCS 100 (not shown explicitly), including servers 104 and user device 120. For example, the peripheral devices may include any photographic or video equipment, a phone, a display monitor, a radio equipment, any manufacturing equipment, any controller, any analog or integrated analog-digital device, any physical or chemical measurement device, and so on. The peripheral devices 124 may be a part of the Internet-of-Things network. The peripheral devices 124 may be communicating with other components of the DCS 100 via any type of direct connection, such as via a parallel, a serial, a USB port, a PCI (peripheral component interconnect) bus, or any type of input/output connection. Alternatively, the peripheral devices 124 may be communicating with other components of the DCS 100 via a network connection, such as a local Ethernet connection, wireless area network, personal area network.

Various resources of the DCS 100 (such as the RAS 110, the servers 104, the user devices 106, the storage devices 106, and/or peripheral devices 124) may be physically located in the vicinity of each other (e.g., in the same room, in the same building) or may be located far from each other. For example, some of the resources of the DCS 100 may be located within (or near) a first office of the organization that uses the DCS 100 whereas other resources of the DCS 100 may be located within (or near) a second office of the organization, with the first and second offices located in different cities, states, or countries. For example, the server 104-1 may be located in California, whereas the server 104-3 may be located in New York or in Amsterdam. In some implementations, communication between such servers may occur over a long-distance network (such as Internet) and may be, optionally, encrypted to ensure security of data.

The DCS 100 may include various off-farm resources, such as off-site servers 132-1, 132-2, and 132-3. The off-site servers 132 may be cloud computing servers and may be connected to the farm 102 resources over a network 130, which may be Internet, in one implementation. Additionally, the network 130 may have access to a cloud storage 134. The cloud storage 134 may be at a different geographical location compared with other resources of the farm 102 and may use third-party cloud storage services or similar platforms. In some implementations, all resources of the farm 102 may be located on a client site and supported by the client-owned hardware. In some implementations, any or all resources of the farm 102 may be located off the client site and supported by a third-party hardware.

Figure 5:
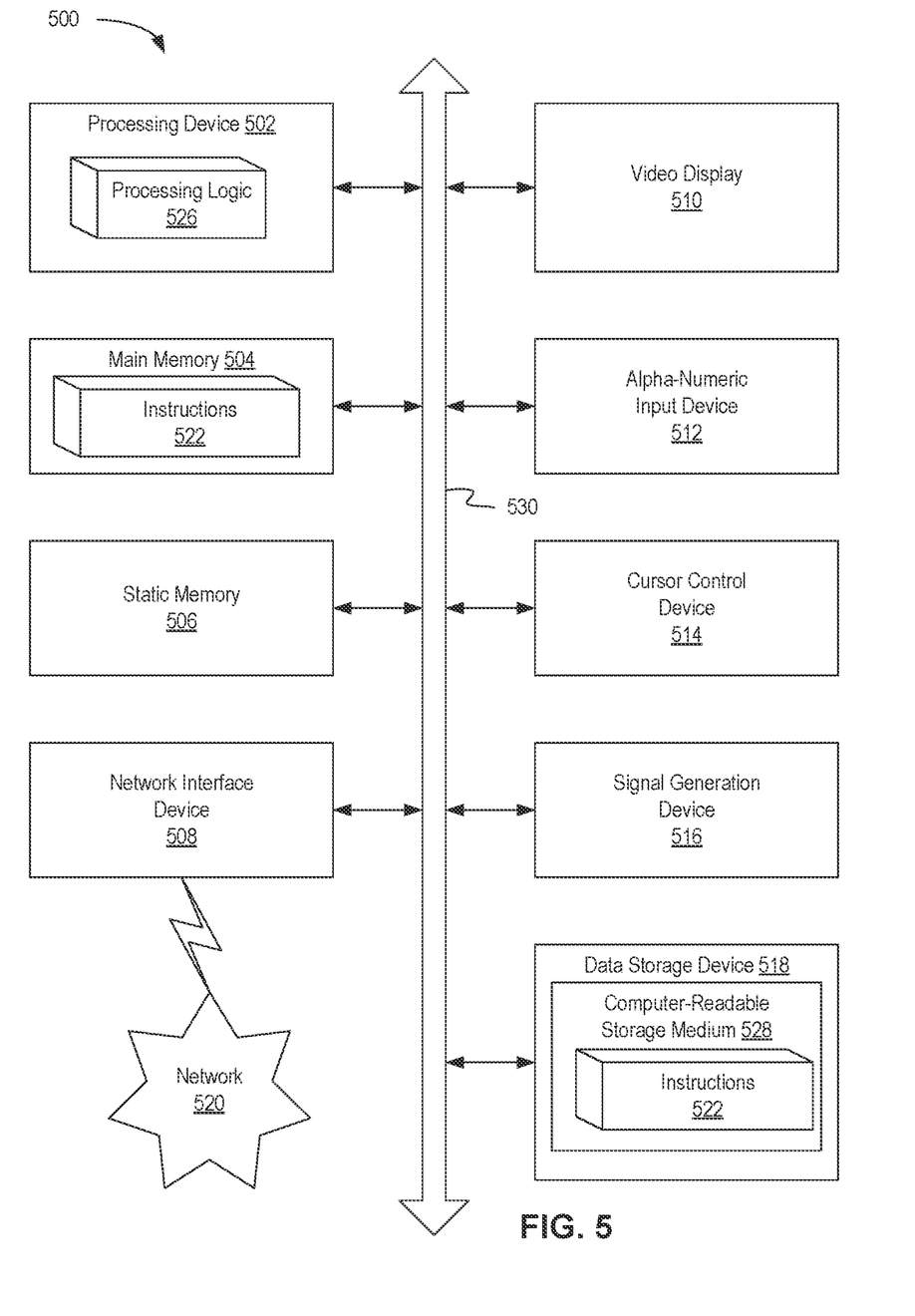
FIG. 5 depicts a block diagram of an example computer device capable of performing analysis of various potential configurations of the distributed computing system using virtual farm simulations, operating in accordance with one or more aspects of the present disclosure.

Each server (such as the RAS 110, the server 104, the off-site server 132) or user device 106 may include one or more CPUs—not explicitly shown on FIG. 1—also referred to as "processing devices," communicatively coupled to one or more memory devices, and one or more peripheral devices via buses (as shown in more detail in FIG. 5). "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices, such as flash memory cards, compact disks, HDDs, or SSDs.

The RAS 110 may be implemented as a software component installed on one of the servers of the client system, e.g., farm 102. In implementations where multiple farms are instantiated, each farm may have a separate RAS. The RAS 110 may include a publishing agent to provide a list of applications to the users of the respective farm 102. The RAS 110 may also have other software installed that is necessary for operations of the farm. For example, a remote desktop server host (RDSH) software may be installed on the RAS 110. When a client logs in into one of the client devices 106, a client authenticating service may determine the client access level, the RAS 110 may provide the list of applications and other computing resources (e.g., peripheral devices 124) available to the user via the publishing server and transmit this list to the user. The list may have graphical representations, such as windows, pop-ups, icons, etc. A console of the RAS 110 provided to the user may be used to display the list of published applications. The RAS 110 may be configured to launch, responsive to the user's input, one or more applications on the farm 102 and provide the applications to the user.

In some implementations, the RAS console provided to the user may be an HTML5-enabled browser. In such implementations, the RAS console may be configured to display published remote applications in one or more HTML pages which may be accessed by HTML5-enabled browsers running on the client devices. Thus, from the user's perspective, the published remote applications may be perceived as web-based applications. A menu associated with each entry of the list may include a plurality of actions accessible to the user with respect to the published application, such as the client gateway identifier, the published application identifier, and the height and width of the frame to be displayed by the client device for rendering the application output. A JavaScript code may be utilized for receiving and displaying the data by the client browser.

Once a request from the user device 106 to execute an application is received by RAS 110 (e.g., by its publishing agent), RAS 110 may select one or more terminal servers for execution of the requested applications. "Terminal server" refers to a component (software or hardware) that is capable of executing the selected application. "Terminal server" may be one of the servers 104 (or off-site servers 132), or a software component installed on one or more of the servers 104 (or off-site servers 132). The RAS 110 may instruct one of the terminal servers to execute the application and facilitate an association of the user device 106 with the terminal server. The terminal server may enable the user to use the resources of the terminal server to execute the application as if the application were local to the user device 106.

Figure 2:
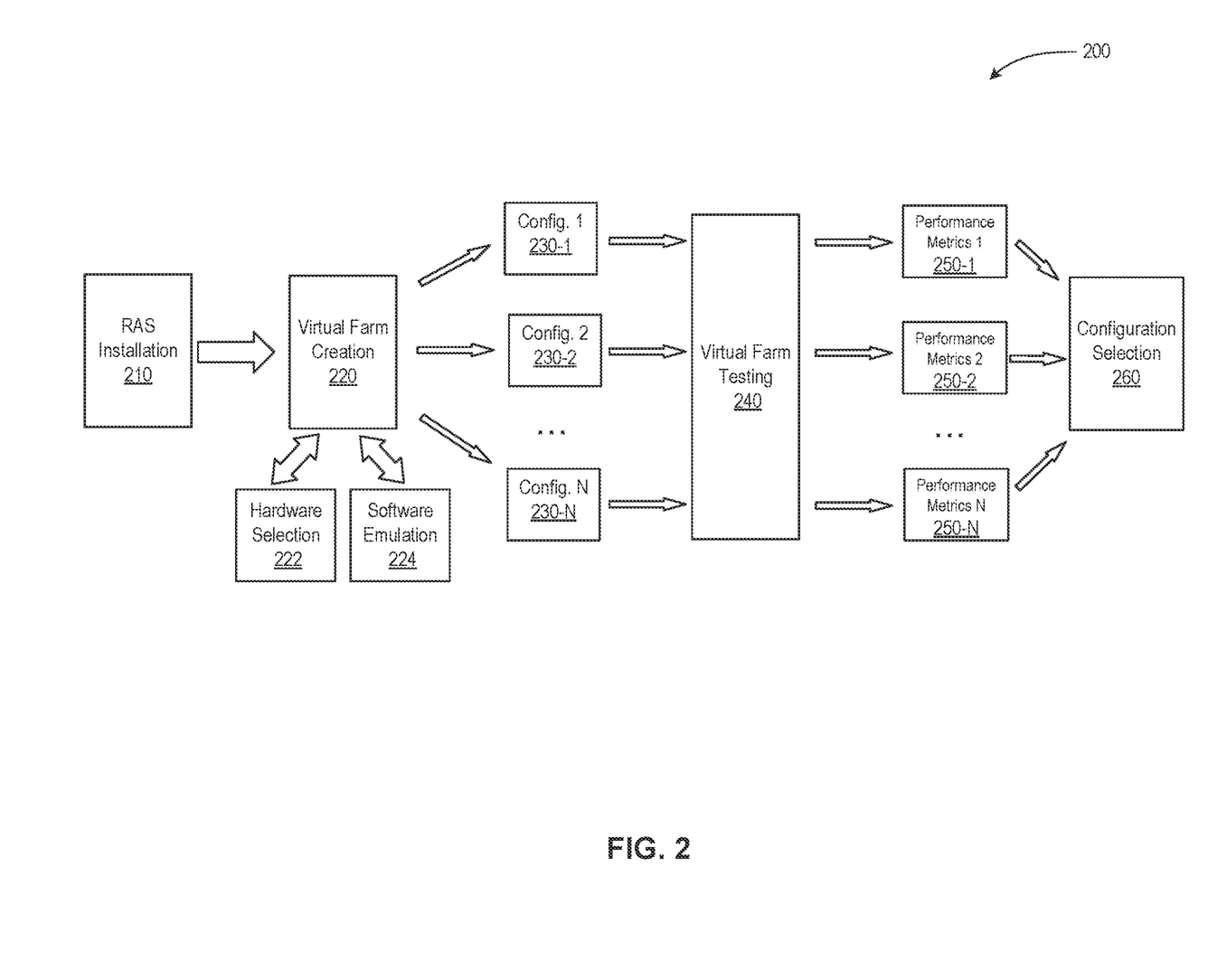
FIG. 2 illustrates schematically analysis of various potential configurations of the distributed computing system using virtual farm simulations, in accordance with implementations of the present disclosure.

The RAS 110 may include a configuration analysis module (CAM) 112 to perform simulations of various configurations of the farm 102 as described below. In some implementations, the simulations may be performed after installation of the RAS 110 but prior to making the resources of the DCS 100 available to the users. FIG. 2 illustrates schematically analysis of various potential configurations of the distributed computing system using virtual farm simulations, in accordance with implementations of the present disclosure. Installation 210 of the RAS 110 my include installation of CAM 112. The CAM 112 may then create (220) one or more virtual farms. Each virtual farm may simulate specific potential configurations of the DCS 100.

"Configuration" refers to a setup of an instance (virtual or actual) of the DCS 100. "Configuration" includes (1) a specification of the hardware accessible to an instance of DCS, (2) a description of the software that can be operated on the instance of DCS, and (3) operational functionality of the instance of DCS, including delineation of specific computing facilities provided to the users of DCS. More specifically, when a virtual farm is created, the CAM 112 may specify (222) a particular hardware to be included in the virtual farm or to be made accessible to the virtual farm. For example, a first virtual farm (configuration 1, 230-1) may include all servers of the farm 102, a second virtual farm (configuration 2, 230-2) may include only servers 104-1 and 104-3, a third virtual farm (configuration 3, 230-3) may include servers 104-2, 104-3, and a number of off-site servers 132, and so on. Likewise, the CAM 112 may specify (224) software (and/or firmware) resources that may be associated with the virtual farm being created. For example, the first virtual farm may provide RDS to each user, the second virtual farm may provide VDI to all users, the third virtual farm may provide RDS to a first group of users and VDI to a second group of users, and so on. The first virtual farm may use a single secure gateway for all users, the second virtual farm may use dual secure gateways, and so on. In the third virtual farm, all graphics and video applications may be executed on the server 104-1 whereas all word processing applications may be executed on server 104-3. In a fourth virtual farm, word processing applications may be executed on either server 104-1 or server 104 (e.g., whichever currently has the lowest total load), whereas all media applications may be executed on the off-site server 132-2. In a fifth virtual farm, all instances of virtual machines provided to users (which may occur upon a user's request or, if specified by the user profile, set up by a system administrator) may be instantiated on the off-site server 132-1. In a sixth virtual farm, storage of data for specific applications may be stored on the cloud storage 134, whereas for all other applications, the data may be stored on the storage device 120-2. It shall be understood by a person of ordinary skill in this technology that there is a virtually unlimited number of configurations that differ from each other by one or more of the hardware specification, the software specification, or the operational functionality of the DCS, set in the context of computational and/or business objectives of the users of the DCS.

In some implementations, various configurations 230-1, 230-2 . . . 230-N of virtual farms to be simulated may be pre-determined by a system administrator (or by a group of experts, including computer, business, finance, marketing, etc. specialists) and stored within the CAM 112. The stored configurations to be tested may include configurations that have been used in the past by the same client or by the provider of DCS services, or configurations that are commonly used by other clients and/or providers. In some instances, even configurations that are unlikely to provide optimal performance may be included for testing with the expectation that in most instances such unlikely candidates would be automatically eliminated during simulations but in some rare instances such candidates may nonetheless result in a viable option, especially when a highly specialized set of tasks is to be executed on the DCS.

During virtual farm testing 240, each of the virtual farm configurations 230-1, 230-2 . . . 230-N may be simulated with respect to performance of a number of target tasks to determine various performance metrics of the DCS 100 during execution of the target tasks. By way of example, the target tasks may include: accessing a public application (installed on the farm 102 or available on cloud), uploading a document on a public server and accessing the uploaded document simultaneously from multiple user devices, exchanging a large number of data between different user devices (or between user devices and various servers 104 or off-site servers 132), accessing a public desktop from a user device (e.g., user device 106-1) and using the public desktop to interact with other users, exchange printer/scanner data between two or more users, and so on.

The outcome of a set of simulations performed on the virtual farm configurations 230-1, 230-2 . . . 230-N may be a set of respective performance metrics 250-1, 250-2 . . . 250-N. Performance metrics (determined for various servers) may include: a number of requests received, an average response time, a peak response time, an average number of requests completed successfully, an average number of returned errors, an average thread count, average hardware utilization levels for CPUs, memory devices, persistent storage devices, bandwidth and throughput of network connections, an average latency, an average length of a queue for peripheral devices, and/or other similar metrics.

In some implementations, the simulations may be performed by selecting, e.g., by the CAM 112, one of the servers of the DCS 100 (e.g., server 104-1, RAS 110, and so on) as the main server (site) of the farm 102. The main server may provide secure gateway functionality, perform load balancing, application publishing, traffic routing, and other operations essential for the functioning of the DCS 100. The CAM 112 may further select some of the remaining servers (e.g., servers 104-2, 104-3, 132-1, etc.)—of such a number and type as required by a particular configuration 230 being tested—as various remote desktop host servers, desktop application servers, personal computer agents, application agents, and the like. For each or some of the configurations 230 being tested, the CAM 112 may use scripts and algorithms (installed on the respective servers) to simulate each server's performance in the tested configuration. For example, scripts may transfer data (using data transfer protocols available to the servers) between any components of the DCS 100 in the configuration being tested. The components may include the servers 104 and/or 132, as well as various user devices 106 and peripheral devices 124. In some implementations, some of the user devices 106 may be connected to the farm whereas some user devices 106 may not yet be connected to the farm.

In some implementations, the user devices may be simulated using scripts installed on the servers 104 and/or 132 if (at least some) user devices are not available (e.g., not yet connected to the farm). The scripts may be configured to generate and send data packages between various servers, user devices, and peripheral devices to emulate actual traffic of the DCS 100 in the configuration being tested. In some implementations, the generated traffic may be unidirectional (to simulate applications that upload or download data, such as streaming applications). In some implementations, the generated traffic may be bi-directional (to simulate applications that require significant transfer of data in both directions, such as interactive video applications), or multi-directional (to simulate applications that are executed on more than one server, e.g., an application whose video component is executed on server 104-1 and whose computational component is executed on server 132-1). In some implementations, the scripts may be configured to emulate traffic that is continuous and has a stable throughput. In other implementations, script may be configured to emulate traffic whose throughput varies significantly with time. More specifically, to simulate such traffic, the scripts may generate data packets and data transfers that have sudden bursts of activity interspersed with periods of relatively small traffic.

During these emulated data exchanges, the servers of the DCS 100 may be monitored, with various performance metrics (such as CPU and memory usage, the network availability, bandwidth, response time, throughput, and the like) measured and collected by the CAM 112 for analysis of the tested configurations. In some implementations, monitoring of these performance metrics may be done by various software components that are already installed on the servers, user devices, and/or peripheral devices. For example, if the server 104-1 is a Linux® server, the "top" command may be used for dynamic real-time monitoring of processes running on the particular machine while "mpstat" may be used for its CPU usage monitoring. Similarly, the "vmstat" command may be used to check virtual memory statistics, "nload" and/or "iftop" commands can be used for network status monitoring, "df" command can be used to check the disk storage, and so on. Similarly, I/O monitoring may be performed (e.g., for testing configurations with respect to their testing printing/scanning capabilities). Appropriate systems and commands can be used in other platforms. For example, on servers and user devices that run a Windows® OS, monitoring may be performed using "Resource Monitor" components that are include in the Windows® installation. In some implementations, if a specific server or a user device lacks monitoring functionality, the CAM 112 may download (e.g., via network 130) and install the necessary monitoring components on those servers and devices.

In some implementations, in addition to producing script-generated traffic, some of the actual software components already installed on the servers can be instantiated and included in testing of various configurations. For example, server 104 may execute a hypervisor and instantiate a number of virtual machines thereon and, additionally, start a variety of applications on the instantiated virtual machines. A script executed on the user device 106-1 may then interact with the server 104 to emulate virtual desktop infrastructure provided by the server 104 to a user of the user device 106-1. In some implementations, some of the DCS 100 functionality may be tested by modeling interactions among various components of the DCS 100 without creating emulated (either by scripts and/or actual applications) data traffic.

In some implementations, the metrics probed by the CAM 112 may include a variety of user-centered metrics. For example, the metrics probed by the CAM 112 may include the time it takes the user of the user device 106-1 (or any other device) to login into the farm 102 and to receive a list of applications accessible to the user. In another example, the metrics probed may include the time it takes a publishing server or RAS 110 to publish an application to the user (e.g., how quickly the user can see the application on the user's interface). In another example, the metrics probed may include the time it takes for an application to be up and running on the user device after the user makes a selection to launch the application. In yet another example, the metrics probed may include the time it takes RAS 110 (or any other server) to restore a container with an application running thereon in case of a container crash or freeze. In some implementations, the metrics probed may include the time to transfer an application (executed within or without a container) to be transferred to another server. In some implementations, the metrics probed may include the time it takes for all or some of applications executed on a specific server (e.g., server 104-2) to be transferred to other servers if the specific server crashes and/or becomes irresponsive.

Figure 3:
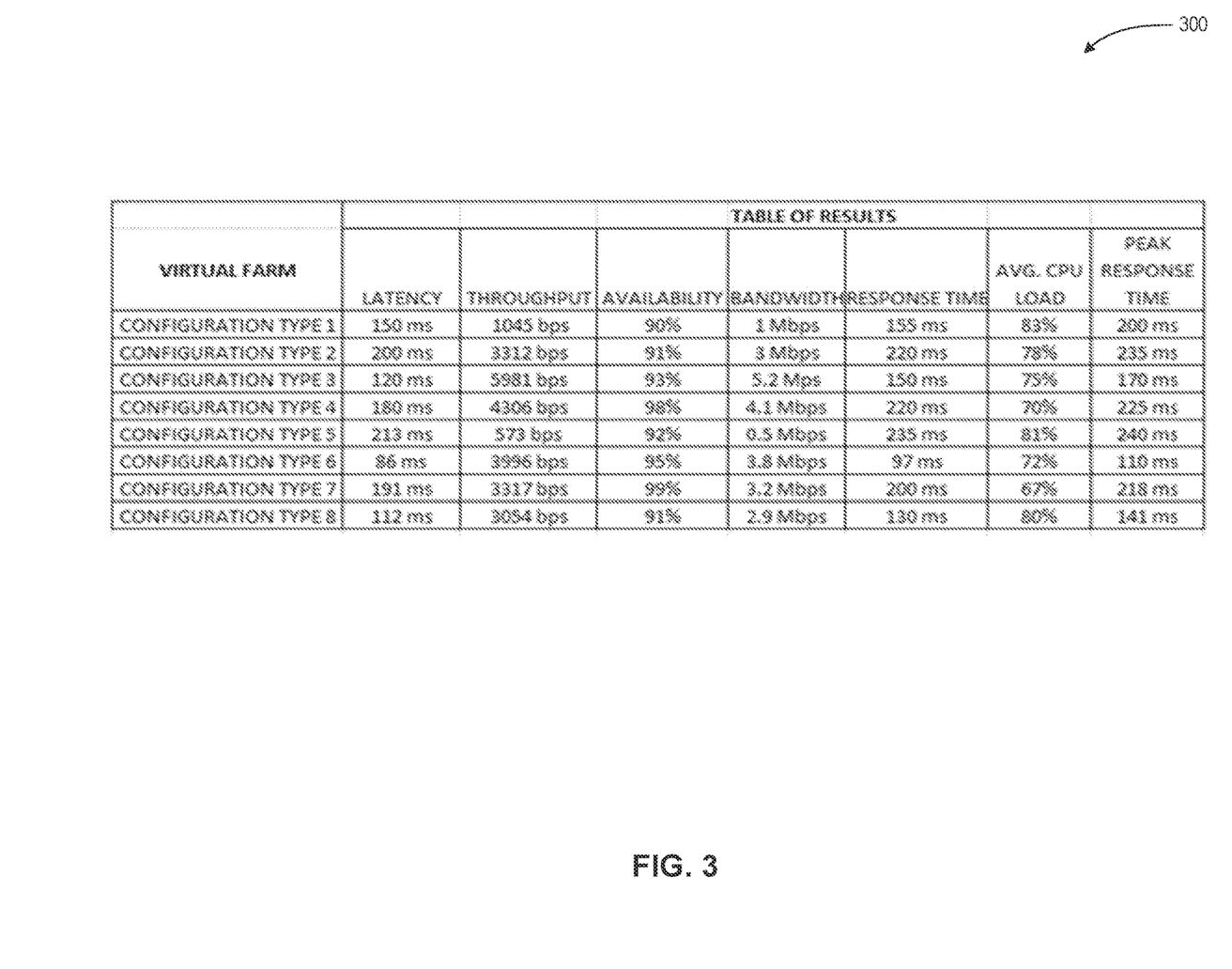
FIG. 3 shows exemplary performance metrics determined by virtual farm testing for some illustrative configurations of a distributed computing system, in accordance with some implementations of the present disclosure.

FIG. 3 shows exemplary performance metrics determined by virtual farm testing for some illustrative configurations of a distributed computing system, in accordance with some implementations of the present disclosure. Shown, for various configurations 230, are (1) average latency of processing requests from user devices on various servers pf the DCS, (2) throughput of data communication between servers and user devices, (3) average server availability to process requests, (4) average bandwidth of network connections, (5) average server response time, (6) average load of processing devices that are used to execute applications provided to the client devices, and (7) a peak response time. The performance metrics shown in FIG. 3 are for illustration only. In some implementations, some of the metrics shown in FIG. 3 may be omitted while other metrics may be added. For example, in some implementations, a non-uniformity of workloads of various servers may be simulated. In other implementations availability of video memory may be added to the performance metrics.

With a continued reference to FIG. 2, the obtained performance metrics 250 may be used to select (260) the most optimal configuration for implementation in the DCS. For example, the performance metrics 250 may be provided to a system administrator. The system administrator may assess the performance metrics and make a decision regarding which configuration is to be implemented in the DCS. In some implementations, the performance metrics 250 may be weighted to obtain a single efficiency value representative of the overall performance of the respective configuration. The weighting scheme used to weigh the performance metrics may reflect expectations of the users of the DCS. For example, some clients (e.g., those who do time-sensitive tasks) may value lower response times higher than a lower average CPU load whereas other clients (e.g., those who generate sudden surges of computational activities) may prioritize a lower average CPU load.

Efficiency values for various configurations 230 may be used by a system administrator as an additional input quantity to help make an informed decision. In some implementations, selection of the optimal configuration may be performed automatically, based on the efficiency value. For example CAM 112 may select the configuration with the highest efficiency value. The CAM 112 may then configure the DCS in accordance with the selected configuration. In some implementations, the CAM 112 may configure the DCS based on instructions from the system administrator. In other implementations, the CAM 112 may configure the DCS without a human input. For example, each of the configurations 230 may be one of the standard configurations of the farm 102 and the DCS 100, and the CAM 112 may be programmed to implement any of such standard configurations automatically.

Figure 4:
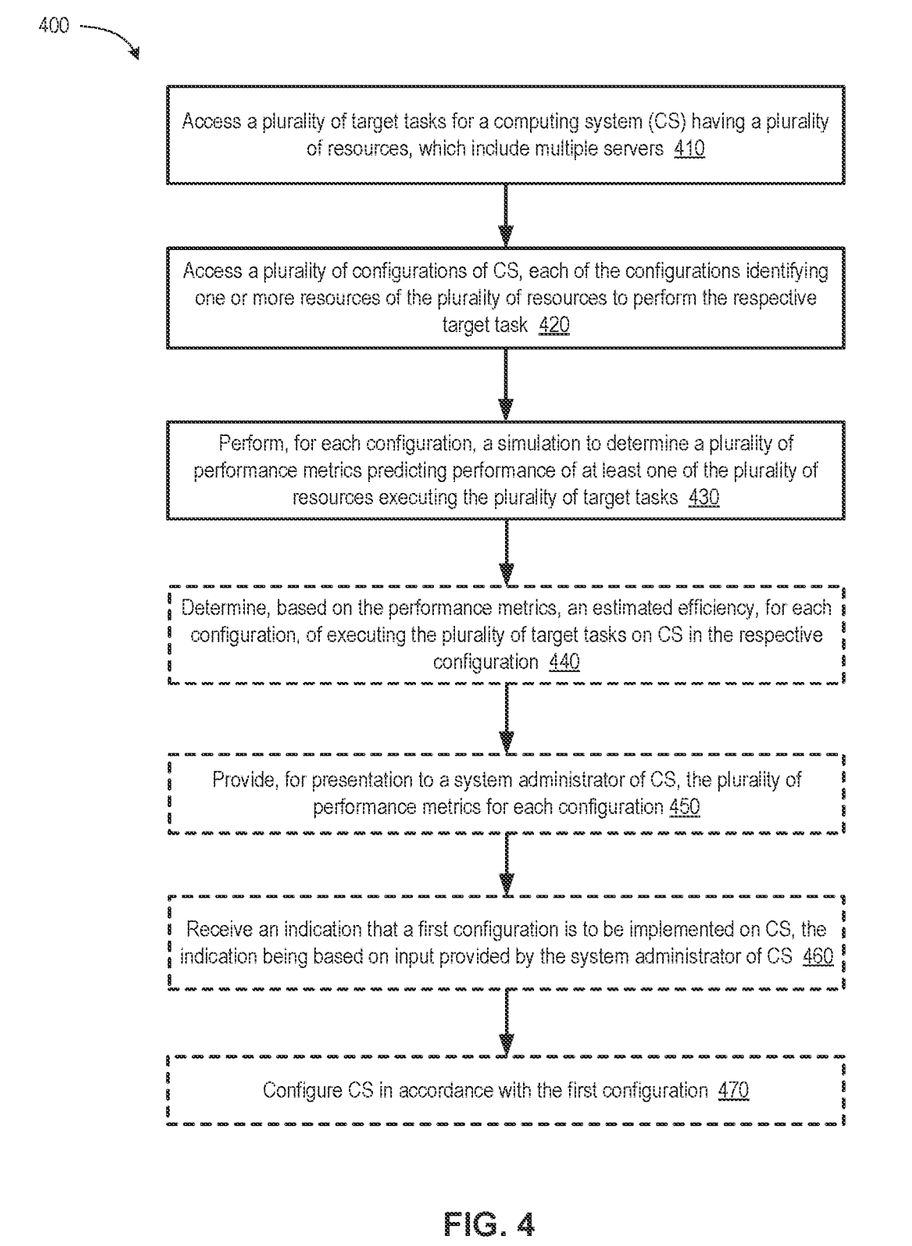
FIG. 4 depicts a flow diagram of one illustrative example of a method of analysis and selection of various potential configurations of a distributed computing system using virtual farm simulations, in accordance with some implementations of the present disclosure.

FIG. 4 depicts a flow diagram of one illustrative example of a method 400 of analysis and selection of various potential configurations of a distributed computing system using virtual farm simulations, in accordance with some implementations of the present disclosure. Method 400 disclosed below, and/or each of its individual functions, routines, subroutines, or operations may be performed by one or more processing units of a processing device implementing the method, e.g., a procession device of the RAS 110, one of the servers 104, one of the off-site servers 132, or another device that is not explicitly shown in FIG. 1. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Various operations of method 400 may be performed in a different order compared with the order shown in FIG. 4. Some operations of the methods may be performed concurrently with other operations. Some operations may be optional.

Method 400 may be directed to a computing system, such as the DCS 100 of FIG. 1, in one implementation. The computing system may have multiple servers. One server of the computing system may be a RAS 110, which may include a publishing server component to publish applications installed (or capable of being installed) on the computing system. In some implementations, the publishing server component may be located not on the RAS 110 but on a separate server, e.g., server 104-1. In some implementations, the computing system may have a first server (e.g., RAS 110 or server 104-1) and a second server (e.g., server 104-2 or off-site server 132-1). In some implementations, both the first server and the second server may execute applications for the users of the computing system, and may be off-site servers 132, whereas the RAS 110 is a "thin" server that publishes applications to the users, chooses which of the servers 132 is to execute an application requested by the user, and directs execution of the requested application to the selected server.

The computing system may support multiple user devices (e.g., user devices 106). The number of user devices may vary depending on the needs of a particular client. For example, the client (e.g., a business, a non-profit, or a government office, etc.) may have only a few users or hundreds, thousands, or more users. Some users may use one of the user's devices 106 whereas other users may access the computing system via multiple user devices 106 (e.g., via an office computer, a home computer, a smartphone/tablet, and so on).

The processing device performing method 400 may determine an optimal configuration, given client organization's goals and resources available to the client. The optimal configuration may be selected from various configurations that the client's computing system may support. As described above, "configuration" refers to any setup of the system where a particular computing functionality is realized as a combination of available software resources implemented on available hardware resources. In one implementation, a configuration may identify (e.g., via registry files, configuration files, libraries, and other resources) what applications, programs, drivers, accesses, firmware and hardware resources, and so on are available to various users and administrators of the computing system. For example, a configuration may specify how many farms (e.g., farms 102) are to be implemented on the computing system. A configuration may specify how many users may have access to a first farm, a second farm, and so on. A configuration may specify how many servers may be in the farm and/or how many off-site servers may be accessible to the farm. A configuration may specify how many users may be provided with specific computing resources, such as remote desktops, virtual machines, word processing applications, media processing applications, graphics applications, or any other types of applications.

A configuration may identify (explicitly, in the form readable by a system administrator, or via various configuration files) specific resources that are to perform various computational tasks. For example, a particular configuration may provide that users from group 1 are to be given, upon successful authentication through a specific gateway/publishing server, remote desktops instantiated on server 104-1. The same configuration may provide that users from group 2 are to be given virtual machines instantiated on server 104-2. The same configuration may further provide that users from group 3 are to be given virtual machines instantiated on server 104-3 but when a particular application (e.g., AutoCAD) is requested by a user, the application is to be instantiated on server 104-2 (or an off-site server 132-3) before being provided to the user. A configuration may further provide what peripheral devices 124 and storage devices 120 may be available to which users (or groups of users). A different configuration may have a different allocation of software and hardware resources. For example, in one configuration all users are provided RDS and no users (except those belonging to a specific group) are to receive a virtual machine. In another configuration, all users may be provided RDS as a default option but some (or all) users may optionally request a virtual machine, at the time of authentication. A person skilled in the art will appreciate that there is virtually unlimited number of configurations of a distributed computing system.

Each of the configurations may provide (e.g., explicitly or via a variety of configuration files) how various computational tasks (e.g., executing application, storing or accessing/downloading/exchanging data, printing, and the like) are to be performed by a combination of software, firmware, and hardware resources (and their interaction) when the computing system is in the respective configuration. At block 410, the processing device performing method 400 may access a subset of tasks, herein referred to as target tasks, of various tasks that the computing system may be capable to perform. The target tasks may be developed by a system administrator, a business manager, or a multi-expertise team of specialists, and stored where indications of the target tasks are accessible to the processing device, e.g., in a library of CAM 112. At block 420, the processing device may similarly access a plurality of configurations to be tested. Of a virtually unlimited number of configurations, the configurations to be tested may be previously selected (and stored where they may be accessed by CAM 112) using a human input, similarly to how target tasks may be selected. Upon accessing the configurations to be tested and the target tasks to be used for testing, the processing device may identify one or more (software, hardware, and firmware) resources that are to perform the target tasks.

In various implementations, blocks 410 and 420 may be performed in different orders. In some implementations, the target tasks are the same for all tested configurations. This may have a benefit of a uniformity of testing, where outcomes of testing may be directly compared to each other, for various configurations. In other implementations, the target tasks may be tailored to the selected configuration. In such implementations, block 410 may be performed after block 420.

At block 430, method 400 may continue with performing, for each of the configurations being tested, a simulation to determine a plurality of performance metrics indicative of a performance of the computing system in each configuration. Each of the plurality of performance metrics may predict performance of one or more resources when such resources are used to execute the plurality of target tasks. As described above in relation to FIG. 2, such performance metrics may include response times (average and peak), latency times, CPU loads, CPU/memory/persistent storage availability, and the like.

At (optional) block 440, method 400 may continue with the processing device determining, based on the plurality of performance metrics, an estimated efficiency for each of the configurations being tested. The estimated efficiency may indicate performance of the computing system in the corresponding configuration. For example, various performance metrics may be weighted to generate a single estimated efficiency value indicative of the overall performance of the computing system. In some implementations, various performance metrics may be weighted to produce two (or more) estimated efficiency values, e.g., "overall processing efficiency" and "overall network efficiency." A particular scheme of weighting of various performance metrics may be determined with a human input, e.g., from the same team of experts which identified various configurations and target tasks.

At (optional) block 450, method 400 may continue with providing, for presentation to a system administrator of the computing system, the plurality of performance metrics for each configuration that has been tested. "A system administrator" may be a single person or a team of people who administer the computing system. In various implementations, the system administrator may receive the performance metrics. In some implementations, the system administrator may receive both the performance metrics from block 430 and the weighted efficiency values from block 440. At (optional) block 460, the processing device performing method 400 may receive an indication that a first configuration of the plurality of configurations is to be implemented. For example, a decision may be made that the first configuration is the optimal configuration. In some implementations, the decision is made by the system administrator (or by some other person or a group of people), based on the plurality of performance metrics (and/or efficiency values). In other implementations, the decision may be made by the processing device performing method 400 without any human input. In such implementations, the processing device may select the first configuration based on determination that the first configuration has the highest efficiency value of all configurations that have been tested. In such implementations, blocks 450 and 460 may not be performed.

At (optional) block 470, method 400 may continue with configuring the computing system in accordance with the first configuration. For example, the processing device may execute a code that automatically configures the computing system in accordance with the first configuration. In some implementations, having made a decision that the first configuration is the optimal configuration, the system administrator or another person (or a group of people) may manually configure the computing system in accordance with the first configuration.

In some implementations, the CAM 112 may be installed on the client network (e.g., the client's servers) temporarily or permanently, and include a number of pre-configured setups (configurations 230) for the client network (farm). The CAM 112 may include a number of scripts. In some implementations, each pre-configured setup may be associated with its respective script. Each script may test the performance of the client farm in the respective setup. For example, a script may first configure the client farm according to the pre-configured setup. More specifically, the script may instantiate a number of core resources (operating systems, hypervisors, remote access servers, applications, and the like) while modelling a number of other resources, e.g., by using traffic-generating algorithms to simulate performance of the farm in the respective setup. After testing each (or some) of the pre-configured setup(s), the CAM 112 may select the most optimal configuration (setup) for the client farm. In some implementations, the CAM 112 may provide results of testing to the administrator of the client farm. After selecting the optimal configuration or receiving a selection from the system administrator, the CAM 112 may execute the corresponding script to configure the client farm in accordance with the selected configuration before providing the farm resources to client's users. In some implementations, the client farm may be re-tested (e.g., during downtime or periodically) and the farm may be reconfigured into a new configuration if it is determined during re-testing that such a new configuration is advantageous to the current configuration of the farm.

FIG. 5 depicts a block diagram of an example computer device 500 capable of performing analysis of various potential configurations of the distributed computing system using virtual farm simulations, operating in accordance with one or more aspects of the present disclosure. In various illustrative examples, computer device 500 may represent the RAS 110, any of the servers 104 or 132, additional terminal servers, and/or user devices 106, as illustrated in FIG. 1.

Example computer device 500 may be connected to other computer devices in a LAN, an intranet, an extranet, and/or the Internet. Computer device 500 may operate in the capacity of a server in a client-server network environment. Computer device 500 may be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 500 may include a processing device 402 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 730.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of performing analysis of various potential configurations of the distributed computing system using virtual farm simulations.

Example computer device 500 may further comprise a network interface device 508, which may be communicatively coupled to a network 520. Example computer device 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 400 of performing analysis of various potential configurations of the distributed computing system using virtual farm simulations.

Executable instructions 522 may also reside, completely or at least partially, within main memory 504 and/or within processing device 502 during execution thereof by example computer device 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   establishing, by a processing device, a plurality of configurations of a computing system where each configuration of the plurality of configurations identifies a subset of a plurality of resources of the computing system;
   establishing, by the processing device, a plurality of task sets where each task set of the plurality of task sets defines a subset of a plurality of target tasks to be executed by the computing system; and
   performing, for each configuration of the plurality of configurations and each task set of the plurality of task sets, a simulation to determine a plurality of performance metrics, wherein each of the plurality of performance metrics predicts performance of at least one resource of the subset of the plurality of resources for that configuration of the plurality of configurations executing that task set of the plurality of task sets.

2. The method according to claim 1, further comprising
   determining, with a configuration analysis module, for each configuration of the plurality of configurations a task set of the plurality of task sets to be associated with that configuration of the plurality of configurations of the computing system in dependence upon overall performance metrics for the plurality task sets simulated with that configuration of the plurality of configurations; wherein
   each overall performance metric for a task set of the plurality of task sets for a configuration of the plurality of configurations is established in dependence upon the plurality of performance metrics determined by the simulation of that task set of the plurality of task sets for that configuration of the plurality of configurations.

3. A method comprising:
   executing a configuration analysis module upon one or more processors forming part of a distributed computing system comprising a plurality of resources;
   retrieving from a memory accessible by the configuration analysis module a plurality of target tasks to be executed by the distributed computing system;
   retrieving from another memory accessible by the configuration analysis module a plurality of configurations of the distributed computing system,
   performing, with the configuration analysis module, a plurality of simulations to determine a plurality of performance metrics where:
      each simulation of the plurality of simulations identifies a subset of the plurality of target tasks and a subset of the plurality of resources to be applied to the subset of the plurality of target tasks; and
      each performance metric of the plurality of performance metrics predicts performance of at least one resource of subset of the plurality of resources to be employed in executing the subset of the plurality of target tasks upon the distributed computing system;
   generating for each simulation of the plurality of simulations an overall performance metric in dependence upon the plurality of performance metrics established for that simulation of the plurality of simulations;
   determining, with the configuration analysis module, a plurality of system configurations in dependence upon the overall performance metrics for the plurality simulations where each system configuration of the plurality of system configurations defines a subset of the plurality of target tasks and that subset of the plurality of resources which upon being applied to the subset of the plurality of target tasks yield the highest overall performance metric.

4. The method according to claim 3, further comprising
   establishing a required set of tasks to be performed in association with a remote session upon the distributed computer system;
   identifying, with the configuration analysis module, the system configuration of the plurality of system configurations where the subset of the plurality of target tasks simulated for that system configuration of the plurality of system configurations matches the required set of tasks;
   configuring, with the configuration analysis module, a portion of the distributed computing system in dependence upon the identified configuration of the plurality of configurations.

5. The method according to claim 3, wherein
   execution of the configuration analysis module to perform the simulations for the plurality of configurations is initiated upon the installation of a software application to the distributed computing system.

6. The method according to claim 3, wherein
   execution of the configuration analysis module to perform the simulations for the plurality of configurations is initiated by the distributed computing system prior to the distributed computing system providing one or more remote sessions to one or more users of the distributed computing system.

7. The method according to claim 4, wherein
   execution of the configuration analysis module to perform the simulations for the plurality of configurations is initiated upon the initiation of the remote session.

\* \* \* \* \*